US008136748B2

(12) United States Patent  
Bisio (10) Patent No.: US 8,136,748 B2
(45) Date of Patent: Mar. 20, 2012

(54) GRATING PLATE FOR CONTAINER/GRATER FOR FRIABLE FOOD PRODUCTS

(75) Inventor: Stefano Bisio, Alessandria (IT)

(73) Assignee: Bisio Progetti S.p.A., Alessandria (IT)

( * ) Notice: Subject to any disclaimer, the term of this patent is extended or adjusted under 35 U.S.C. 154(b) by 190 days.

(21) Appl. No.: 12/255,318

(22) Filed: Oct. 21, 2008

(65) Prior Publication Data

US 2009/0277982 A1    Nov. 12, 2009

(30) Foreign Application Priority Data

May 7, 2008    (IT) .................................. TO08A338

(51) Int. Cl.
*B02C 17/02* (2006.01)
*B07B 13/00* (2006.01)

(52) U.S. Cl. ........................................ 241/95; 241/273.2
(58) Field of Classification Search .................... 241/95, 241/273.2
See application file for complete search history.

(56) References Cited

U.S. PATENT DOCUMENTS

| 1,811,017 | A | * | 6/1931 | Lehman | 241/273.2 |
| 2,013,900 | A | * | 9/1935 | Settles | 241/273.2 |
| 2,318,142 | A | * | 5/1943 | Cox et al. | 241/84.4 |
| 2,477,198 | A | * | 7/1949 | Murray | 241/273.2 |
| 2,504,900 | A | * | 4/1950 | Stollsteimer | 241/278.1 |
| 2,639,748 | A | * | 5/1953 | Peel | 241/273.1 |
| 5,537,918 | A | * | 7/1996 | Patel et al. | 99/510 |
| 6,318,652 | B1 | * | 11/2001 | Liu | 241/95 |
| 7,318,558 | B2 | * | 1/2008 | Canegallo | 241/95 |
| 7,648,088 | B2 | * | 1/2010 | Eikelenberg et al. | 241/30 |

FOREIGN PATENT DOCUMENTS

| EP | 1554962 A1 | 7/2005 |
| GB | 1282940 A | 6/1919 |
| GB | 2396320 A | 6/2004 |
| WO | 9917649 A1 | 4/1999 |
| WO | 2007144908 A1 | 12/2007 |

\* cited by examiner

*Primary Examiner* — Bena Miller
(74) *Attorney, Agent, or Firm* — Edwards Wildman Palmer LLP; Peter C. Lauro, Esq.; Brian R. Landry, Esq.

(57) ABSTRACT

A grating plate (1) for a container/grater for friable food products, in particular hard cheese, is described, which is contained in a base (10) on which a reverse cup-shaped element is assembled for defining a chamber for the product, the grating plate (1) composing the bottom of the chamber and having a plurality of openings (27) with whose edges respective teeth (25), projecting in the containing chamber, are associated; the plate (1) is not equipped with supporting ribs and is equipped with a convex surface (29) adjacent to a lower cutting floor of the plate (1), the convexity of the surface (29) being adapted to make it reach a maximum height (A) with respect to the horizontal cutting plane of the plate (1) in the points of the plate (1) that are furthest from the center of the base (10) corresponding to the longitudinal axis of the rod (20), such height (A) progressively decreasing till it becomes zero at the center of the base (10), next to the longitudinal axis of the grating plate (1) and of the rod (20).

20 Claims, 7 Drawing Sheets

GRATING PLATE FOR CONTAINER/GRATER FOR FRIABLE FOOD PRODUCTS

CROSS-REFERENCE TO RELATED APPLICATIONS

This application claims priority to Italian patent application Ser. No. TO2008A338, filed May 7, 2008. The entire contents of the aforementioned patent application are incorporated herein by this reference.

BACKGROUND OF THE INVENTION

1. Field of the Invention

The present invention refers to a grating plate for container/grater for friable food products, such as hard cheese to be grated.

2. Background Art

A known container/grater performs both the function of housing for the food product, insulating it from the external environment during its transport and storage in the sales point and by the customer, and the function of a grater upon consuming the cheese, as disclosed for example in documents GB-A-1282940, WO-A-99/017649, GB-A-2396320 e EP-A-1554962, this latter one assigned to the same Applicant of the present Application.

The above known models of container/grater of this type comprise:
- a base on which a reverse cup-shaped element is rotatingly assembled in such a way as to define a chamber for containing the food product, the base comprising a grating plate that makes the chamber bottom and has a plurality of through holes with the edges of which respective teeth are associated that project in the chamber,
- a threaded rod that extends upwards from the grating plate in the chamber, and
- a pressure plate having a central threaded hole that is engaged by the threaded rod and having an external perimeter adapted to engage the internal wall of the reverse cup-shaped element so that the rotation of the reverse cup-shaped element with respect to the base implies the translation of the pressure plate along the rod and the compression of the food product against the plate, so that the food product is crumbled and dispensed from the containing chamber.

A common problem to all these containers is that, in case of drop or violent impact, the threaded rod and the base are subjected to a reflected force from the internal food product, that, being hard or heavy, distorts them and often breaks them, sharply detaching the rod at its root, and also breaks the external transparent container, making de facto the container unusable as a whole.

The above problem has been solved by the Applicant of the present invention with a reinforced container/grater for friable food products as disclosed in document WO-A-2007/144908. Such document, however, solves the problem of the distortion of the cutting floor of the grating plate during the phase of use while grating is performed with the use of ribs.

SUMMARY OF THE INVENTION

Object of the present invention is solving with a single arrangement the above prior art problems, by providing a grating plate for container/grater, that is not subjected to internal or external distortions or breakages in case of impacts, drops or other impact events, and that simultaneously is not subjected to distortion of the cutting floor of the grating plate during its use while grating is performed, keeping the cutting floor smooth, namely without ribs.

Another object of the present invention is providing a grating plate as mentioned above that can be easily and economically made, obtaining the reinforcement and distortion-preventing functionalities without the use of additional arrangements.

The above and other objects of the invention, as will appear from the following description, are obtained with a grating plate for a container/grater as claimed in claim 1. Preferred embodiments and non-trivial variations of the present invention are the subject matter of the dependent claims.

BRIEF DESCRIPTION OF THE DRAWINGS

The present invention will be better described by some preferred embodiments, provided as a non-limiting example, with reference to the enclosed drawings, in which.

DETAILED DESCRIPTION OF PREFERRED EMBODIMENTS OF THE INVENTION

With reference to the Figures, a preferred embodiment of the grating plate for a container/grater of the present invention will be described. It will be immediately obvious to a common technician of the field that the invention can be applied to other types of container/grater, both currently manufactured, and adapted to be made in the future.

Figure 1:
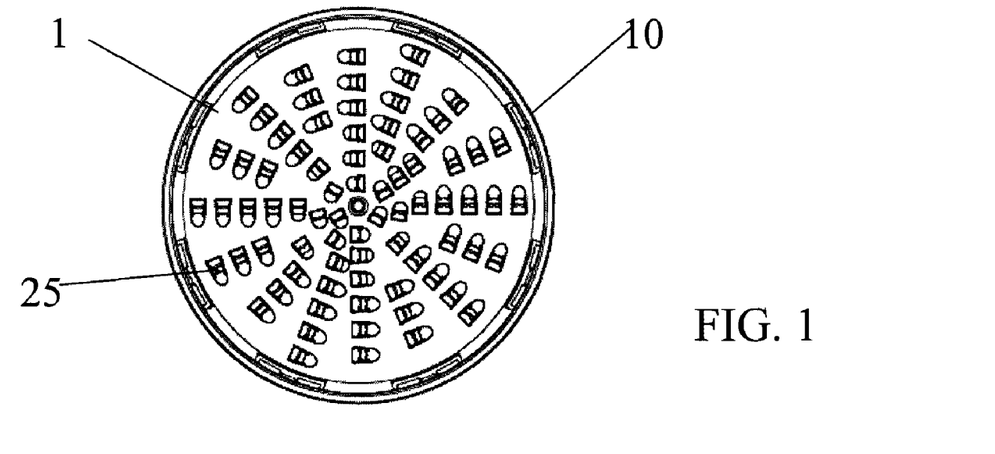
FIG. 1 is a top view of a first preferred embodiment of the grating plate of the present invention equipped with small cutting teeth.
Figure 2:
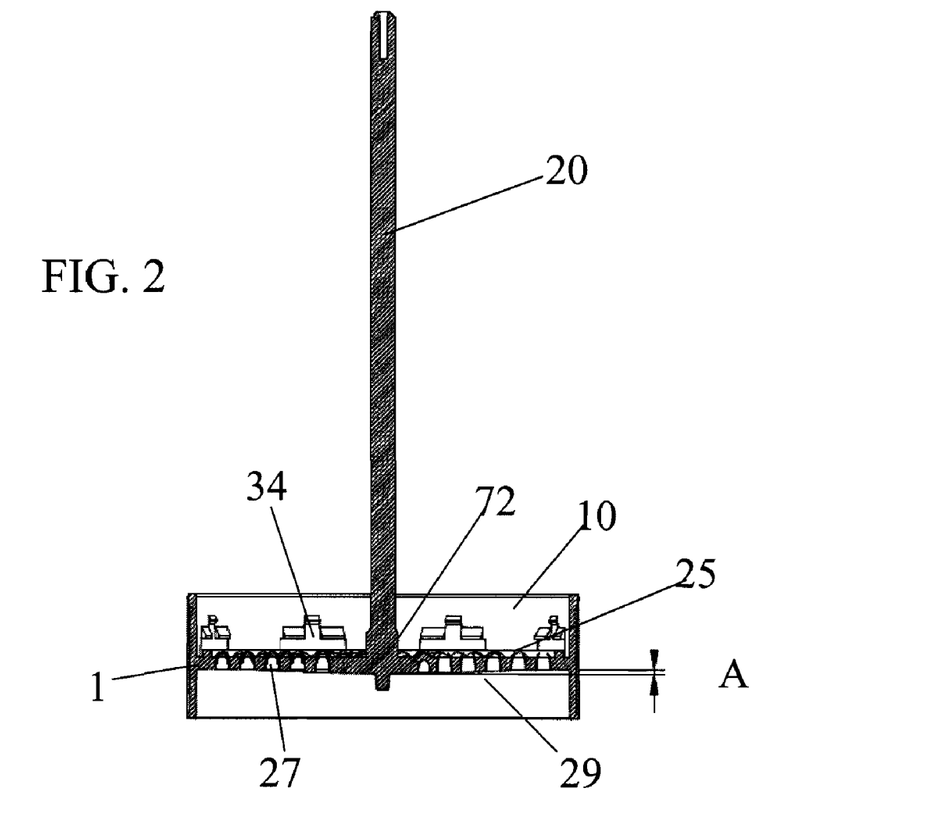
FIG. 2 is a side sectional view of the grating plate of FIG. 1 with related operating rod.
Figure 6:
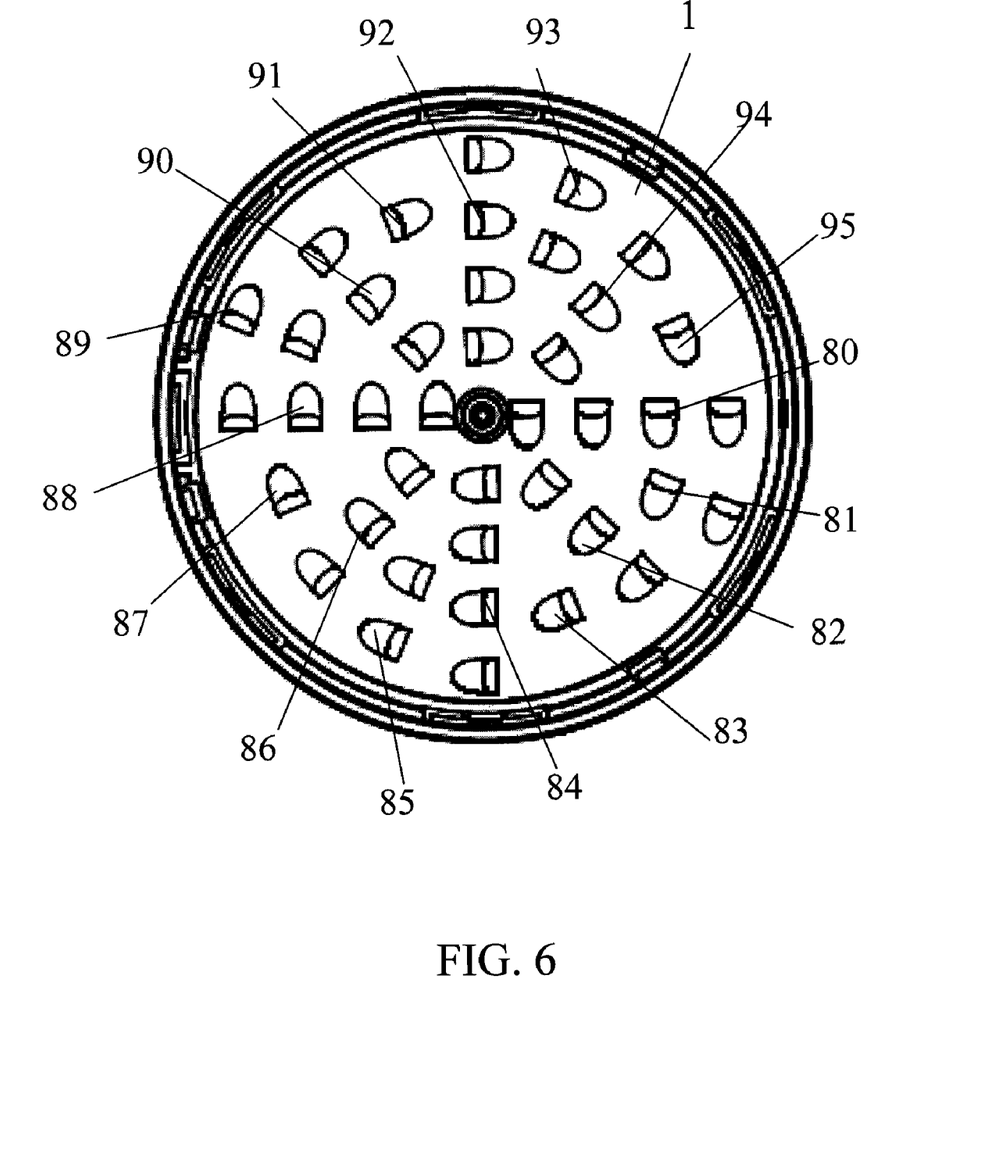
FIG. 6 is a top view of a second preferred embodiment of the grating plate of the present invention equipped with big cutting teeth.
Figure 7:
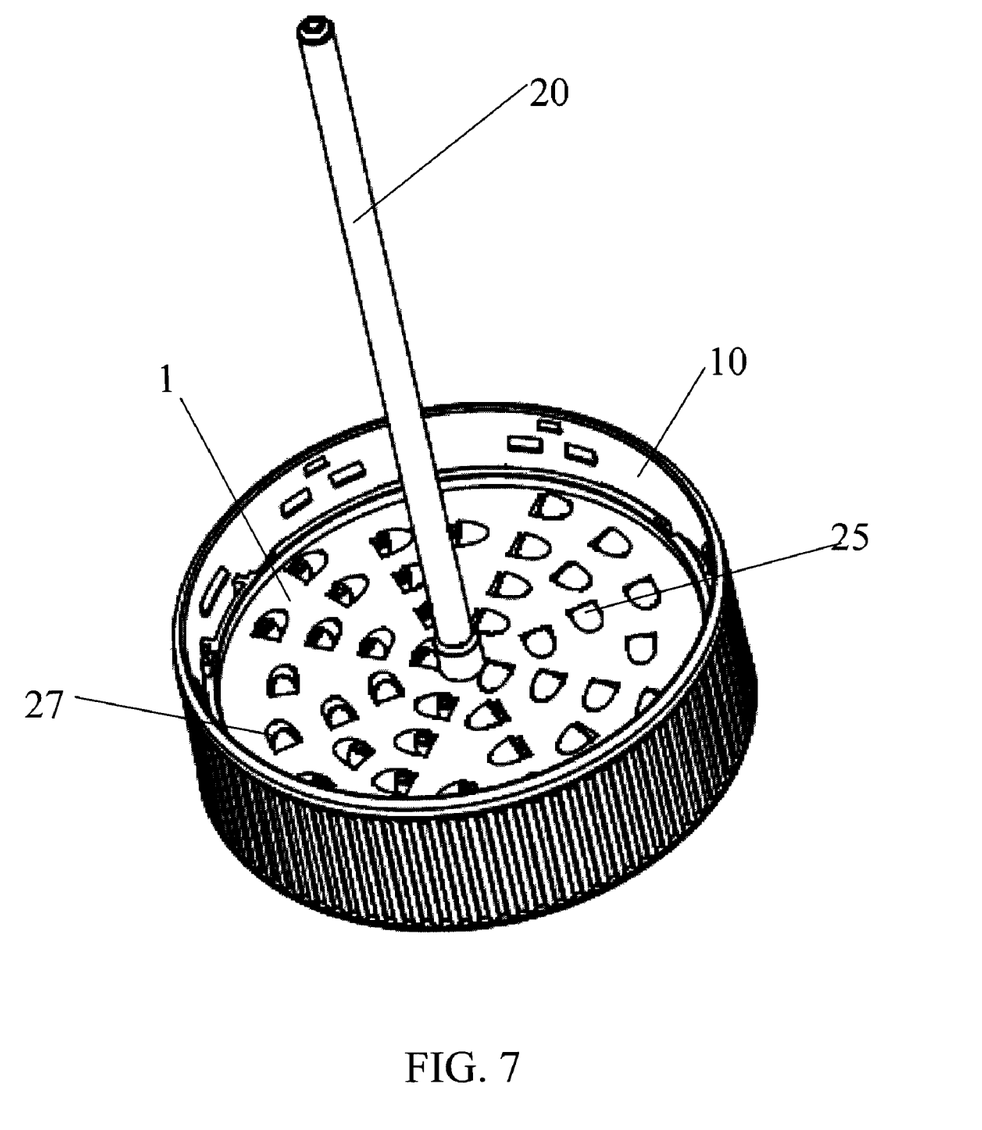
FIG. 7 is a perspective view of the plate of FIG. 6 with related rod.

The grating plate 1 of the invention is adapted to be used in a container/grater (not shown) of a known type, for example the one disclosed in document WO-A-2007/144908. Such plate 1 can be used for a friable food product, in particular a piece of hard cheese, and is preferably made in two different versions (respectively shown in FIGS. 1 and 6) that are mutually different only regarding the size of the cutting teeth 25 and their arrangement on the plate 1 itself.

The plate 1 is contained in a base 10 on which a reverse cup-shaped element (not shown), having a circular or polygonal, particularly square, cross section, is rotatingly assembled in such a way as to define a chamber (not shown) for containing the cheese.

The base 10 is composed of a circular sleeve inside which the grating plate 1 is transversally fastened and makes the bottom of the containing chamber.

A rod 20 having an axis parallel with the axis of the base 10 extends upwards from the centre of the grating plate 1 in the containing chamber of the product to be grated.

Moreover, the grating plate 1 is equipped with a plurality of cutting teeth 25 adapted to grate the product and to let it drop into corresponding openings 27 with which every cutting tooth 25 communicates, so that the grated product goes out of the container/grater for its consumption.

As known, the container/grater further comprises a pressure plate (not shown) having a central threaded hole (not shown) that is engaged by the threaded rod 20 and has an external perimeter adapted to engage the internal wall of the reverse cup-shaped element in such a way that the rotation of the reverse cup-shaped element with respect to the base 10 generates the translation of the pressure plate along the rod 20 and the compression of the food product against the plate 1 so that the food product is crumbled and dispensed by the containing chamber.

The further and detailed operation of the container/grater to which the plate 1 is applied, is better described in document WO-A-2007/144908, and therefore it will not be further described in detail herein.

In the Figure, hooks 34 can also be noted, placed on the base 10 and adapted to engage corresponding projections (not shown) placed on the reverse cup-shaped element for its final operating engagement to make the finished container/grater. The lower edge of the base 10 can be closed by a removable cover (not shown).

Differently from the previous container/grater disclosed in document WO-A-2007/144908, the grating plate 1 of the present invention does not need the supporting ribs that allowed the previous plate to prevent the rod 20 from breaking; moreover, for the particular configuration in which it is made, the grating plate 1 of the present invention also allows solving the problem of the distortion of the cutting floor during its use when grating.

Figure 3:
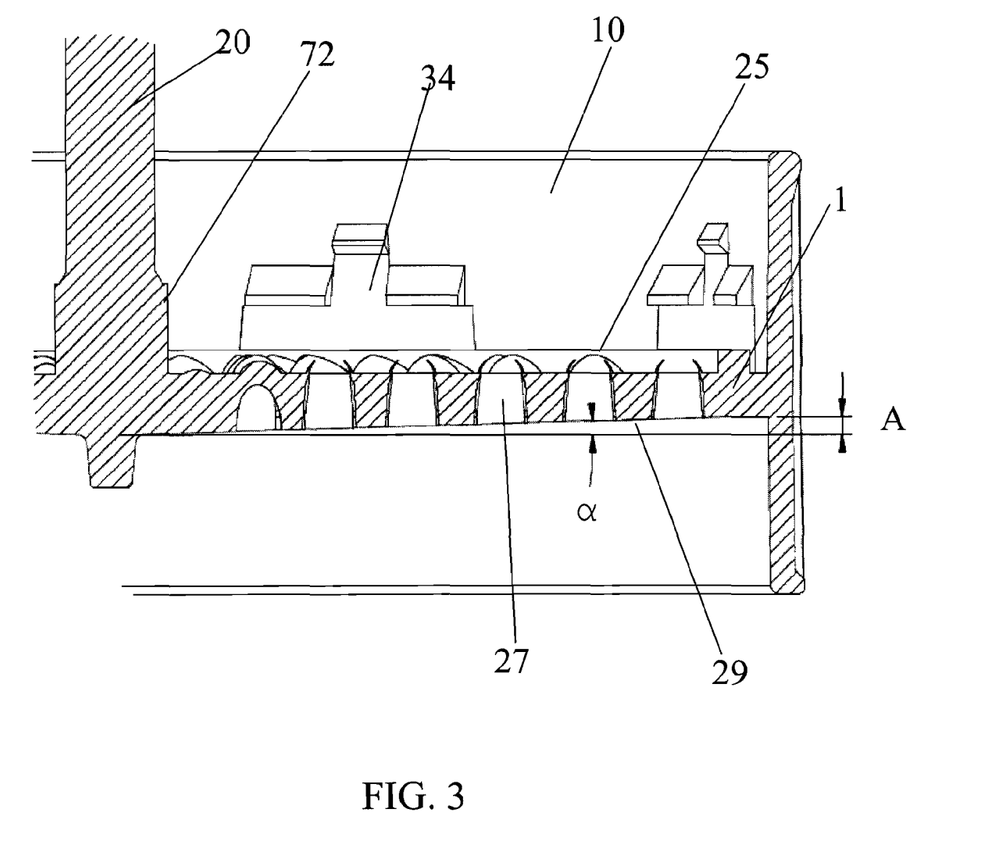
FIG. 3 is a detailed view of FIG. 2.
Figure 4:
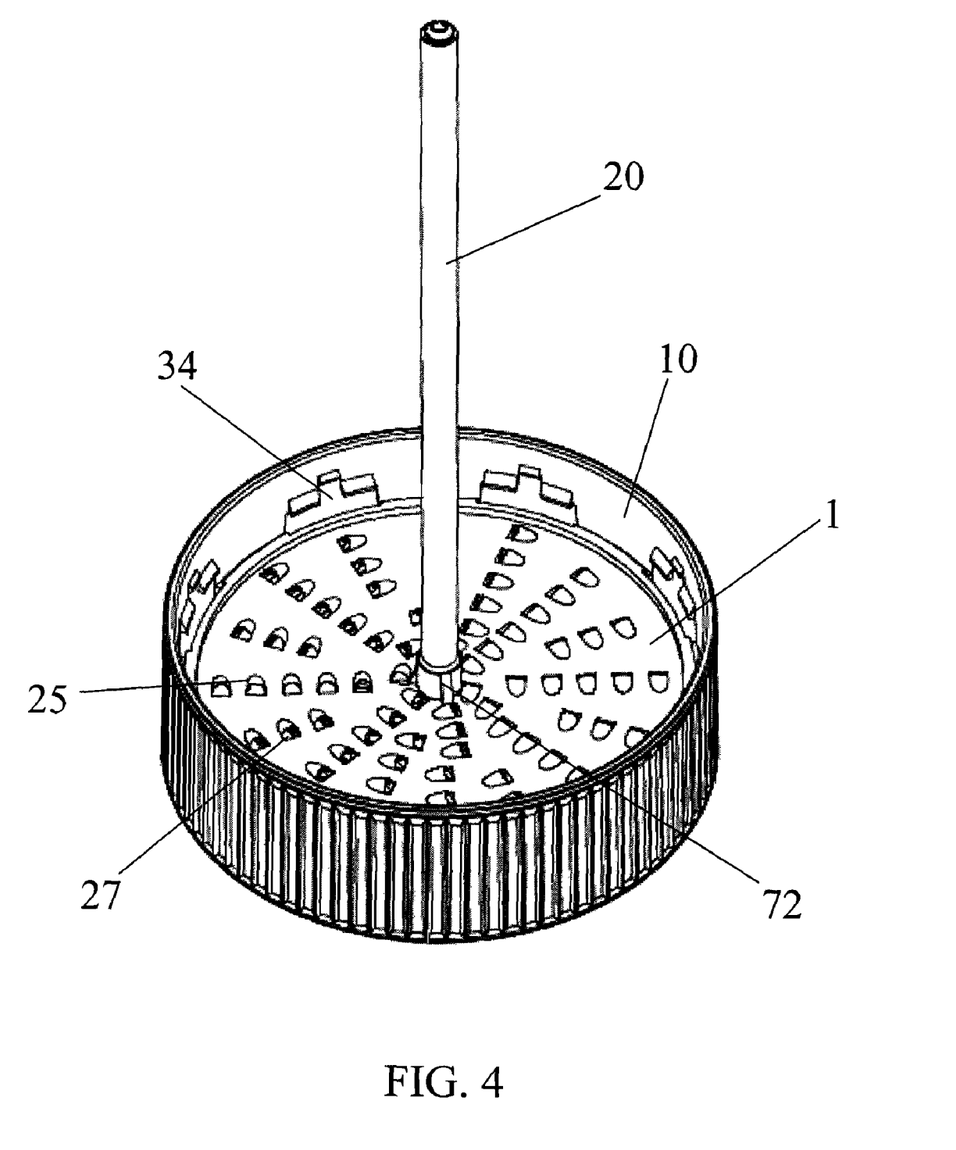
FIG. 4 is a perspective view of the grating plate and of the rod of FIG. 2.
Figure 5:
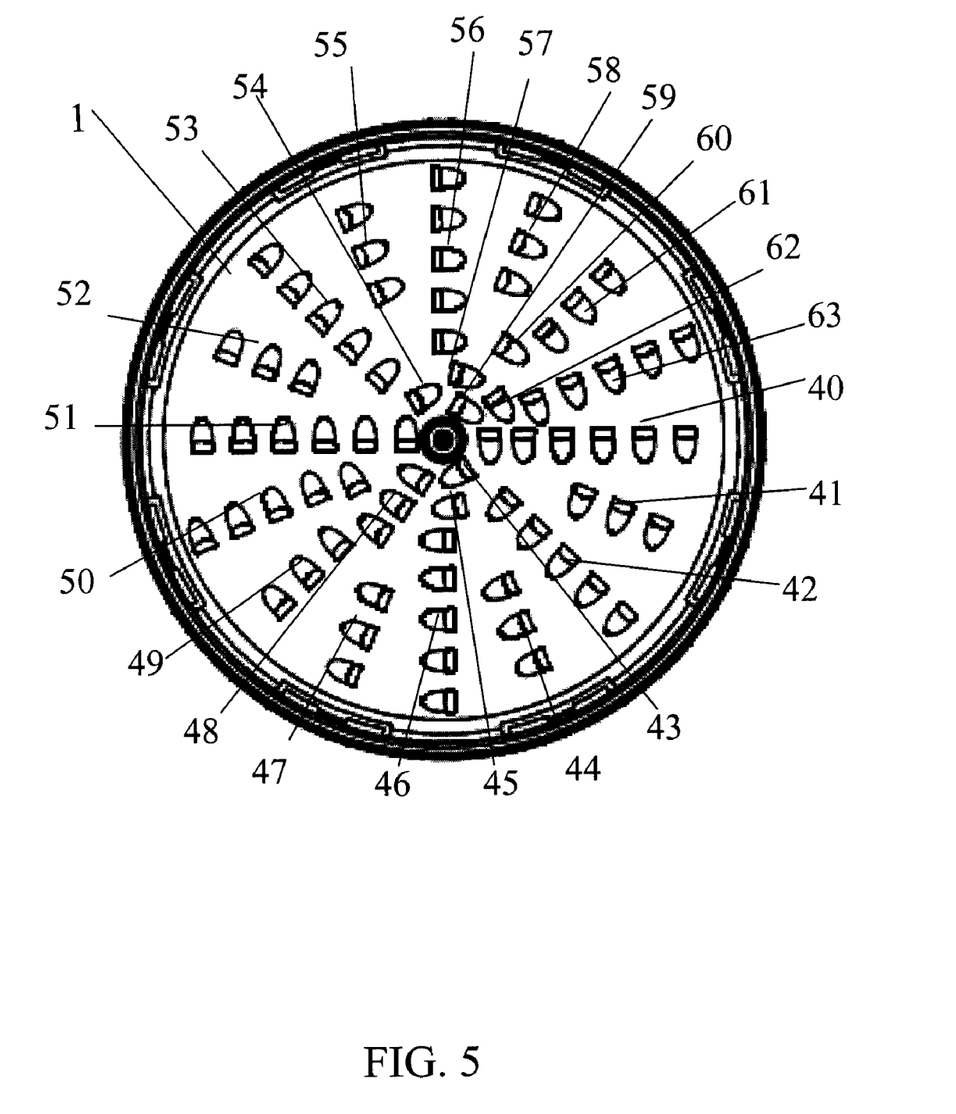
FIG. 5 is a slightly enlarged view with respect to FIG. 1 in order to better show the arrangements of the cutting teeth.

Both these results are obtained by making the grating plate 1 equipped with a convex surface 29 adjacent to the lower cutting floor of the plate 1: the convexity is better shown in FIG. 3, where it can be seen that the surface 29 reaches a maximum height A (where A>0) with respect to the horizontal cutting plane of the plate 1. The convexity preferably defines an angle $\alpha$ or is arc-shaped, as shown.

In the preferred embodiment of the grating plate 1 of the invention, the maximum height A reached by the plate 29 is 1 mm, while such height A more and more increases till it becomes zero in the centre of the base 10, namely next to the longitudinal axis of the grating plate 1 and the rod 20. A cutting surface 29 is then made, whose thickness is maximum at the centre (next to the longitudinal axis of the grating plate 1) and goes on decreasing towards the outside of the plate 1.

With this simple arrangement, thereby saving component parts, moulding steps and final production costs, the same results are obtained as those of the prior container/grater (WO-A-2007/144908) and moreover the distortions of the cutting floor of the plate 1 are avoided.

In order to provide a further reinforcement feature, the rod 20 can be equipped with a plurality of shoulders 72 provided in the connection point between base 10 and rod 20 inside the plate 1. In the preferable solution, the shoulders 72 are two or three, abut onto the base 10 and are placed at the same distance around the rod 20.

When grating, the rotation of the reverse cup-shaped element (to which the product to be grated, for example a piece of cheese, is secured), with respect to the base 10, implies a downward translation of a pressure plate (not shown) placed along the rod 20 and the compression of the piece of cheese against the plate 1. The cheese is thereby crumbled by the teeth 25 into fragments which pass through the openings 27 and fall downwards.

Figure 8:
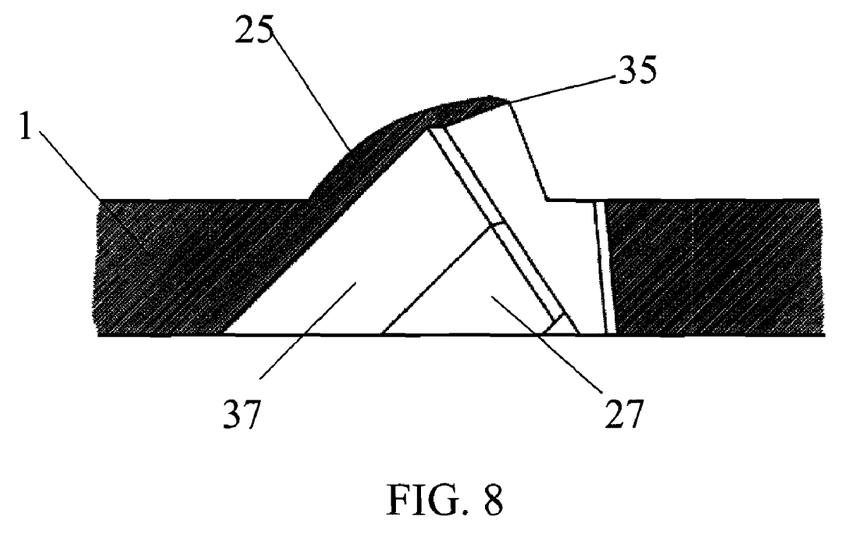
FIG. 8 is a side sectional view of a first embodiment of one of the teeth of the plate of FIG. 6.
Figure 9:
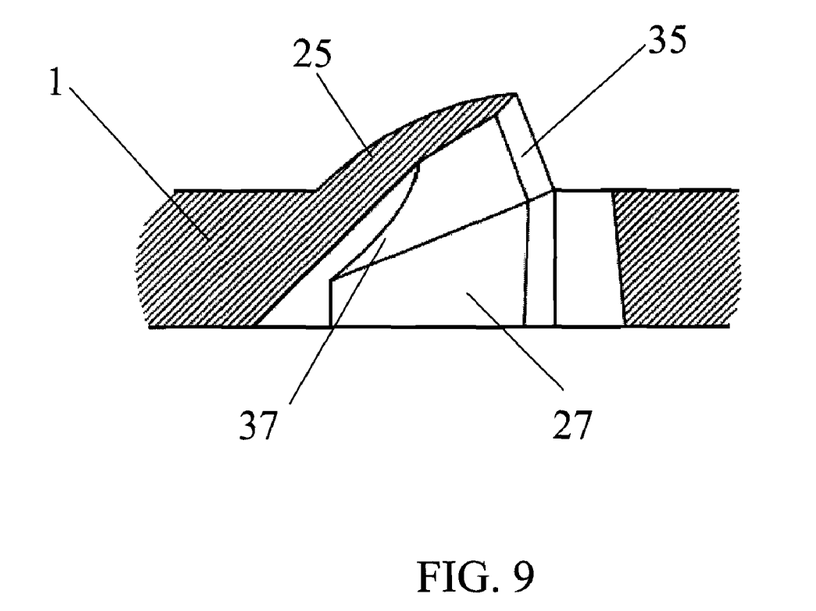
FIG. 9 is a side sectional view of a second embodiment of one of the teeth of the plate of FIG. 6.

The further features of the inventive plate 1 deal with the shape and arrangement of the cutting teeth 25. In particular, the teeth 25 shown in the various Figures have a cutting rake 35 external to the opening for passing the product to be grated, in order to reduce possible resistances offered by the product itself. Moreover, the rear area 37 of the tooth 25 (placed next to the outlet of the grated product) has been unloaded, in order to further limit the product-accumulation effect (FIG. 8). FIG. 9 shows a variation of FIG. 8, in which the cutting rake 35 compresses the part of the product to be grated.

Finally, in order to guarantee a smooth cutting of the product in the two versions with small teeth 25 (FIGS. 1 to 5) and big teeth 25 (FIGS. 6 to 9), their arrangement on the plate 1 has been accurately studied in order to provide optimum cutting quality and smoothness, by inserting as many teeth 25 as possible inside the container. In order to obtain this, the following configurations have been adopted:

plate 1 with small cutting teeth 25 (FIGS. 1 to 5): the cutting teeth 25 are radially arranged in a plurality (preferably 24) of radial rows, each one comprising from 1 to a plurality (preferably 6) of teeth 25, every row being offset by a certain angle with respect to an adjacent row. In detail, the preferred configuration comprises: a first row 40 with six teeth, a second row 41 with three teeth, a third row 42 with five teeth, a fourth row 43 with one tooth, a fifth row 44 with three teeth, a sixth row 45 with one tooth, a seventh row 46 with five teeth, an eighth row 47 with three teeth, a ninth row 48 with three teeth, a tenth row 49 with three teeth, an eleventh row 50 with five teeth, a twelfth row 51 with five teeth, a thirteenth row 52 with three teeth, a fourteenth row 53 with five teeth, a fifteenth row 54 with one tooth, a sixteenth row 55 with three teeth, a seventeenth row 56 with five teeth, an eighteenth row 57 with one tooth, a nineteenth row 58 with three teeth, a twentieth row 59 with one tooth, a twenty-first row 60 with one tooth, a twenty-second row 61 with three teeth, a twenty-third row 62 with one tooth, and a twenty-fourth row 63 with five teeth.

plate 1 with big cutting teeth 25 (FIGS. 6 to 9): the cutting teeth 25 are radially arranged in a plurality (preferably 16) of radial rows, each one comprising from 1 to a plurality (preferably 4) of teeth 25, every row being offset by a certain angle with respect to an adjacent row. In detail, the preferred configuration comprises: a first row 80 with four teeth, a second row 81 with two teeth, a third row 82 with three teeth, a fourth row 83 with one tooth, a fifth row 84 with four teeth, a sixth row 85 with two teeth, a seventh row 86 with three teeth, an eighth row 87 with one tooth, a ninth row 88 with four teeth, a tenth row 89 with two teeth, an eleventh row 90 with three teeth, a twelfth row 91 with one tooth, a thirteenth row 92 with four teeth, a fourteenth row 93 with two teeth, a fifteenth row 94 with three teeth, and a sixteenth row 95 with one tooth.

The invention claimed is:

1. A grating plate comprising a plurality of openings with teeth along edges thereof wherein the plate is equipped with a convex surface positioned opposite a cutting floor of the plate, a convexity of the convex surface being adapted to make the grating plate reach a minimum thickness at the edge of the grating plate thickness continuously increasing until a maximum thickness is reached at the center of the grating plate.

2. A grating plate of claim 1, wherein the difference between the maximum thickness and the minimum is 1 mm.

3. A grating plate of claim 1, wherein the rod is further equipped with a plurality of shoulders provided in a connecting point between the grating plate and the rod.

4. A grating plate of claim 3, wherein the shoulders are two or three and are placed at a same distance around the rod.

5. A grating plate of claim 1, wherein the teeth have a cutting rake external to an opening for passing the product to be grated, the rake being adapted to reduce possible resistances offered by the product.

6. A grating plate of claim 5, wherein a rear area of every tooth, placed next to where the grated product goes out, is unloaded, in order to limit a product accumulation effect.

7. A grating plate of claim 1, wherein the cutting teeth are radially arranged in a plurality of radial rows, each row comprising from one to a plurality of teeth, each row being offset by a certain angle with respect to an adjacent row.

8. A grating plate of claim 7, wherein the teeth are arranged on the plate in: a first row with six teeth, a second row with three teeth, a third row with five teeth, a fourth row with one tooth, a fifth row with three teeth, a sixth row with one tooth, a seventh row with five teeth, an eighth row with three teeth, a ninth row with three teeth, a tenth row with three teeth, an eleventh row with five teeth, a twelfth row with five teeth, a thirteenth row with three teeth, a fourteenth row with five teeth, a fifteenth row with one tooth, a sixteenth row with three teeth, a seventeenth row with five teeth, an eighteenth row with one tooth, a nineteenth row with three teeth, a twentieth row with one tooth, a twenty-first row with one tooth, a twenty-second row with three teeth, a twenty-third row with one tooth, and a twenty-fourth row with five teeth.

9. A grating plate of claim 7, wherein the teeth are arranged on the plate in: a first row with four teeth, a second row with two teeth, a third row with three teeth, a fourth row with one tooth, a fifth row with four teeth, a sixth row with two teeth, a seventh row with three teeth, an eighth row with one tooth, a ninth row with four teeth, a tenth row with two teeth, an eleventh row with three teeth, a twelfth row with one tooth, a thirteenth row with four teeth, a fourteenth row with two teeth, a fifteenth row with three teeth, and a sixteenth row with one tooth.

10. A grating plate of claim 1, wherein a threaded rod extends from the center of the grating plate.

11. A grating plate of claim 1, wherein the grating plate is received within a base.

12. The grating plate of claim 11, wherein the base is substantially cylindrical.

13. A grating plate comprising:
a substantially planar cutting floor; and
a convex surface opposite the substantially planar cutting floor, the convex surface arranged such that grating plate has a thickness continuously increasing between a minimum thickness at the edge of the plate and a maximum thickness at the center of the plate.

14. The grating plate of claim 13, wherein the grating plate is not equipped with supporting ribs.

15. A grating plate of claim 13, wherein the difference between the maximum thickness and the minimum thickness of the grating plate is 1 mm.

16. A grating plate of claim 13, further comprising a plurality of openings with teeth along edges thereof.

17. A grating plate of claim 16, wherein the teeth have a cutting rake external to an opening for passing the product to be grated, the rake being adapted to reduce possible resistances offered by the product.

18. A grating plate of claim 17, wherein a rear area of every tooth, placed next to where the grated product goes out, is unloaded, in order to limit a product accumulation effect.

19. A grating plate of claim 16, wherein the cutting teeth are radially arranged in a plurality of radial rows, each row comprising from one to a plurality of teeth, each row being offset by a certain angle with respect to an adjacent row.

20. The grating plate of claim 13, wherein a threaded rod is coupled to the center of the cutting floor of the grating plate.

* * * * *